Dec. 20, 1927. 1,653,015
F. F. KOELLN
BOLT
Filed Nov. 1, 1926
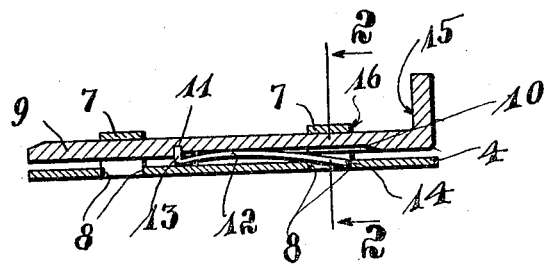
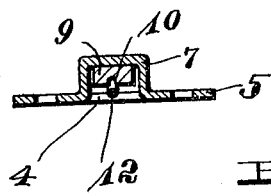
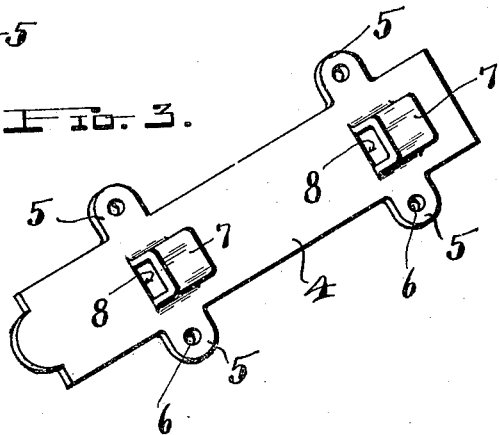
INVENTOR:
FERDINAND FREDERICK KOELLN, Patented Dec. 20, 1927.

1,653,015

UNITED STATES PATENT OFFICE.

FERDINAND FREDERICK KOELLN, OF LOS ANGELES, CALIFORNIA.

BOLT.

Application filed November 1, 1926. Serial No. 145,501.

This invention relates to manually shiftable bolts, used for locking doors, windows, sashes, covers, boxes and the like.

One of the objects of this invention is to provide a device of simple construction which requires little handwork in the manufacturing and assembling, the base being stamped out of one piece of sheet metal, the bolt being bent and made from one piece and provided with a groove and a hole in its underside, and a spring being provided in the groove and hole between the bolt and the base.

Other objects will appear from the following description and appended claim as well as from the accompanying drawing, in which—

Fig. 1 is a longitudinal midsectional view of a device embodying this invention.

Fig. 2 is a cross-section on line 2—2 of Fig. 1.

Fig. 3 is a perspective view of the base-plate of the device.

Devices of this kind are commonly applied to the surface in such a manner that the shiftable bolt can be used to lock a door, or sash, or cover in relation to a frame-structure.

As illustrated in the drawing, the base-plate 4 is preferably stamped out of one piece of sheet metal with the lugs 5 extending from the side-edges of the plate, having holes 6 by which the base-plate can be fastened to the surface, and having certain portions 7 cut along edges 8 and then depressed, while in the cutting or forming dies, into proper shape to allow an insertion of a bolt between the portions 7 and the base-plate. A bolt 9 is illustrated in proper position in Figs. 1 and 2. This bolt is provided with a groove 10 in its underside and a hole 11. A spring 12 is provided with a hook-end 13 by which the spring is held against shifting movements in relation to the bolt 9 by having this hook-end 13 disposed in the hole 11 of the bolt. The larger portion of the spring 12 is of a shape that it may be pressed into the groove 10 in the underside of the bolt. This spring 12, however, is bent in order to serve as a friction means between the bolt and the base-plate 4.

The shape of the spring in being bent serves also as a stopping means for the shifting movements of the bolt in relation to the base-plate. The free end 14 of the spring 12 is intended to drop into one of the cut-outs, from which the portions 7 have been depressed, so that this free end 14 of the spring abuts against the rearmost edge within the rearmost cut-out against one of the edges 8, as clearly illustrated in Fig. 1. The bolt 9 can be shifted outwardly until the front-side 15 of the upwardly bent handle portion of the bolt abuts against the rearmost edge of the rearmost portion 7, indicated at 16.

This device is completely stamped and formed by machinery, and the assembling is accomplished by merely inserting the hook-end 13 of the spring into the bolt 9 and then shifting the bolt through the tube portion 17 into proper position within the base-plate 4. Once pushed in beyond the one of the cut-outs below one of the portions 7, the bolt becomes locked within the base.

The bolt may be removed from the base by a simple lifting of the free end 14 of the spring out of the cut-outs to point above the base 4 to allow a rearward shifting of the bolt from its locking position in the base-plate.

Having thus described my invention, I claim:

In a device of the class described, a bolt made out of one piece being bent at one end upwardly to form a handle-portion and having an elongated recess in its underside, a base plate stamped out of one piece of sheet metal having cuts made from the underside and portions between pairs of cuts depressed to project upwardly above the top-side in the form of loops through which said bolt can be shiftably mounted above the base-plate, and a spring inserted into said recess of the bolt between the bolt and the base plate with one of its ends disposed to drop into one of the cut-outs left by the said loop depressions adapted to form the stop for the shifting movements of said bolt in one direction with the said handle-portion forming a stop for the bolt to abut against said loop-portion in the opposite direction.

In testimony that I claim the foregoing as my invention I have signed my name.

FERDINAND FREDERICK KOELLN.